United States Patent
Kim et al.

(10) Patent No.: US 8,675,465 B2
(45) Date of Patent: Mar. 18, 2014

(54) METHOD OF CONTROLLING LIGHT, AND OPTICAL PICKUP DEVICE AND OPTICAL DISK DRIVE ADOPTING THE METHOD

(75) Inventors: Ui-yol Kim, Suwon-si (KR); Yong-jae Lee, Suwon-si (KR)

(73) Assignee: Toshiba Samsung Storage Technology Korea Corporation, Suwon-si (KR)

( * ) Notice: Subject to any disclaimer, the term of this patent is extended or adjusted under 35 U.S.C. 154(b) by 174 days.

(21) Appl. No.: 13/178,286

(22) Filed: Jul. 7, 2011

(65) Prior Publication Data

US 2012/0008475 A1     Jan. 12, 2012

(30) Foreign Application Priority Data

Jul. 12, 2010    (KR) .................. 10-2010-0066996

(51) Int. Cl.
     *G11B 7/00*         (2006.01)

(52) U.S. Cl.
     USPC .................................. 369/112.16; 369/112.22

(58) Field of Classification Search
     None
     See application file for complete search history.

(56) References Cited

U.S. PATENT DOCUMENTS

| | | |
|---|---|---|
| 2004/0027939 A1 | 2/2004 | Okada |
| 2005/0100061 A1 | 5/2005 | Masui et al. |
| 2009/0168628 A1* | 7/2009 | Nishimoto et al. ............ 369/103 |
| 2009/0201787 A1* | 8/2009 | Ogasawara et al. ....... 369/112.23 |
| 2009/0274029 A1* | 11/2009 | Izawa et al. ..................... 369/94 |
| 2009/0274031 A1* | 11/2009 | Kouno ....................... 369/112.03 |
| 2009/0323501 A1* | 12/2009 | Yanagawa et al. ........ 369/112.03 |
| 2010/0027386 A1* | 2/2010 | Nagatomi et al. .......... 369/44.32 |
| 2010/0027404 A1* | 2/2010 | Nagatomi et al. ........ 369/112.23 |

FOREIGN PATENT DOCUMENTS

| | | |
|---|---|---|
| JP | 2009-146528 | 7/2009 |
| JP | 2009-223937 | 10/2009 |
| KR | 10-2000-0014233 | 3/2000 |
| KR | 10-2007-0084802 | 8/2007 |

OTHER PUBLICATIONS

Korean Office Action issued Jan. 14, 2013 in counterpart Korean Application No. 10-2010-0066996; (4 pages, in Korean).

* cited by examiner

*Primary Examiner* — Paul Huber
(74) *Attorney, Agent, or Firm* — NSIP Law

(57) ABSTRACT

An optical pickup device, an optical disk drive and method of controlling light performed by the optical pickup device are provided. The optical pickup device includes: a light transmitting system including an object lens for facing a medium having a multi recording layer for storing information, a light source system for providing a plurality of beams used to record information on or reproduce information from the multi recording layer via the light transmitting system, a light-receiving system disposed on a path of a beam reflected from the medium, and a light controller including a light control device for controlling stray light generated in the medium such that the stray light does not reach the light-receiving device.

25 Claims, 9 Drawing Sheets

METHOD OF CONTROLLING LIGHT, AND OPTICAL PICKUP DEVICE AND OPTICAL DISK DRIVE ADOPTING THE METHOD

CROSS-REFERENCE TO RELATED APPLICATION(S)

This application claims the benefit under 35 U.S.C. §119(a) of Korean Patent Application No. 10-2010-0066996, filed on Jul. 12, 2010, in the Korean Intellectual Property Office, the entire disclosure of which is incorporated herein by reference for all purposes.

BACKGROUND

1. Field

The following description relates to an optical pickup device for optically recording information on, and detecting information from, a medium or a disk. Also, the following description relates to a method performed by an optical pickup device of controlling light directed to a medium having a multilayer structure, and an optical pickup device and an optical disk drive adopting the method.

2. Description of the Related Art

An optical pickup device using a 3-beam method obtains one main beam and two sub beams by using a diffraction element disposed between a beam splitter and a light source. A light-receiving sensor that converts a beam reflected from a medium into an electric signal includes a main beam region, to which the main beam reaches, and sub beam regions, to which the sub beams reach, at sides of the main beam region.

In such an optical pickup device using a 3-beam method, a $0^{th}$ beam, i.e., a main beam, is used to generate a main push-pull (MPP) signal of a track error signal (TES), a focus error signal (FES), and a radio frequency (RF) signal, and $-1^{st}$ and $+1^{st}$ beams, i.e., sub beams, are used to generate a sub push-pull (SPP) signal of the TES.

Examples of a medium having a multilayer structure, for example, at least two recording layers, are a digital versatile disk (DVD) and a Blu-ray disk (BD). While recording information on, or reproducing information from, a medium having a multilayer structure, interference light may be generated in a layer of the medium other than a layer that is being accessed. The interference light and stray light may diffuse widely, and thus operate as optical noise in an SPP signal. As such, the interference light and stray light operating as optical noise in an SPP signal may interfere with controlling of tracking on the medium.

Such a phenomenon occurs in dual layer (DL) mediums and multilayer (ML) mediums.

SUMMARY

In one general aspect, there is provided an optical pickup device including a light transmitting system including an object lens for facing a medium having multiple recording layers for storing information, a light source system for providing a plurality of beams used to record information on or reproduce information from the multi recording layer via the light transmitting system, a light-receiving system disposed on a path of a beam reflected from the medium, and the light-receiving system including a light-receiving device that comprises a plurality of light-receiving cells corresponding to the plurality of beams, and a light controller including a light control device for controlling stray light generated in the medium such that the stray light does not reach the light-receiving device, in the light transmitting system.

The light control device may include a polarized light controller corresponding to the plurality of light-receiving cells, wherein the polarized light controller blocks or diffracts first polarized light from among first and second polarized lights.

The polarized light controller may generate ±1st light by diffracting the first polarized light from among the first and second polarized lights, and the light-receiving device may include an auxiliary light-receiving cell for receiving ±1st light of effective light generated in the medium from among the diffracted first polarized light.

The plurality of beams may include a main beam and two sub beams disposed at sides of the main beam, and the light-receiving device may include a main light-receiving cell corresponding to the main beam, and sub light-receiving cells respectively corresponding to the two sub beams.

The light control device may include a polarization diffraction element for controlling the stray light such that the stray light does not reach the plurality of light-receiving cells, and the polarized light controller may be a polarization hologram region for diffracting first polarized light from among first and second polarized lights. The polarization hologram region may diffract the stray light reflected from the medium such that the stray light is not incident on the light-receiving device, and diffract a part of effective light reflected from the medium to the sub light-receiving cells.

In another aspect, there is provided a method of controlling a light, performed by an optical pickup device, the method including forming, by the optical pickup device, a plurality of beams directed toward a recording layer of an information storage medium, generating, by the optical pickup device, an electric signal by transmitting a beam reflected from the information storage medium to a light-receiving device, and controlling, by the optical pickup device, stray light generated in the information storage medium such that the stray light does not reach the light-receiving device from the beam reflected from the information storage medium.

The controlling of the stray light may include blocking or diffracting first polarized light from among first and second polarized lights.

The controlling of the stray light may include generating ±1st light by diffracting the first polarized light from among the first and second polarized lights and transmitting ±1st light of effective light generated in the information storage medium from among the diffracted first polarized light to the light-receiving device.

The plurality of beams may include a main beam and two sub beams disposed at sides of the main beam, and the light-receiving device may include a main light-receiving cell corresponding to the main beam, and two sub light-receiving cells respectively corresponding to the two sub beams.

The light control device may include a polarization diffraction element for controlling the stray light such that the stray light does not reach the plurality of light-receiving cells. The polarization diffraction element may be a polarization hologram region for diffracting first polarized light from among first and second polarized lights, and the polarization hologram region may diffract the stray light reflected from the medium such that the stray light is not incident on the light-receiving device, and diffract a part of effective light reflected from the medium to the sub light-receiving cells.

In another aspect, there is provided an optical disk drive including an optical pickup device including a light transmitting system comprising an object lens for facing a medium having a multi recording layer for storing information, a light source system for providing a plurality of beams used to record information on or reproduce information from the multi recording layer via the light transmitting system, a light-receiving system disposed on a path of a beam reflected from the medium, and including a light-receiving device that includes a plurality of light-receiving cells corresponding to the plurality of beams. The optical pickup device also includes a light controller including a light control device for controlling stray light generated in the medium such that the stray light does not reach the light-receiving device, in the light transmitting system. The optical disk drive further includes an information processing unit for processing a signal output from the optical pickup device, a servo unit for generating a control signal for controlling the optical pickup device, and a central processing unit for controlling the information processing unit and the servo unit.

The light control device may control the stray light such that the stray light does not reach the plurality of light-receiving cells of the light-receiving device.

The light control device may include a polarized light controller corresponding to the plurality of light-receiving cells.

The polarized light controller may block or diffract first polarized light from among first and second polarized lights.

The polarized light controller may control light diffracted by diffracting first polarized light from among first and second polarized lights such that the light does not reach the plurality of light-receiving cells.

The polarized light controller may generate ±1st light by diffracting first polarized light from among first and second polarized lights, and the light-receiving device may include an auxiliary light-receiving cell for receiving ±1st light of an effective light generated in the medium from among the diffracted first polarized light.

A ¼ wave plate may be disposed between the light controller and the object lens.

The light-receiving device may include a main light-receiving cell corresponding to a main beam and two sub light-receiving cells respectively corresponding to two sub beams.

The sub light-receiving cells may be disposed at sides of the main light-receiving cell, the light control device may include a polarization diffraction element for controlling the stray light such that the stray light does not reach the plurality of light-receiving cells, and the polarized light controller may be a polarization hologram region, in which first polarized light from among first and second polarized lights is diffracted. The polarization hologram region may diffract the stray light reflected from the medium such that the stray light is not incident on the light-receiving device, and diffract a part of effective light reflected from the medium to the sub light-receiving cells.

A ¼ wave plate may be disposed between the light controller and the object lens.

In another aspect, there is provided an optical pickup device including a light transmitting system, a light source system, a light receiving system, and a light controller. The light controller includes a ¼ wave plate and a polarization control device configured to block or diffract stray light, such that stray light does not reach the light receiving system.

The polarization control device may include a polarized light controller formed as a strip of a predetermined width and extending in one direction.

The polarized light controller may a light blocking region or hologram diffraction region.

Other features and aspects may be apparent from the following detailed description, the drawings and the claims.

BRIEF DESCRIPTION OF THE DRAWINGS

Throughout the drawings and the detailed description, unless otherwise described, the same drawings reference numerals will be understood to refer to the same elements, features, and structures. The relative size and depiction of these elements may be exaggerated for clarity.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

Figure 1:
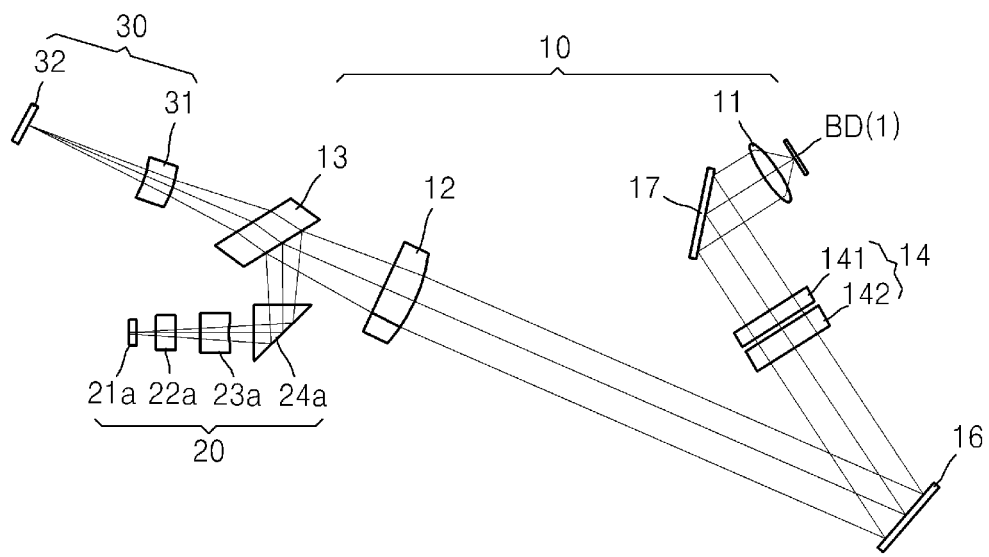
FIG. 1 is a schematic diagram illustrating an example of an optical pickup device.

FIG. 1 illustrates a schematic structure of an example of an optical pickup device using a 3-beam method for Blu-ray disks (BDs), wherein the optical pickup device uses a medium 1 having a multilayer structure.

The optical pickup device includes a light transmitting system 10 directly corresponding to the medium 1 and a light source system 20 for providing a plurality of beams to record or reproduce information on, and/or read or record information from, the medium 1. The plurality of light beams may include, for example, a main beam at a center and first and second sub beams at sides of the main beam. The optical pickup device 10 further includes a light-receiving system 30 for generating an electric signal, such as a data signal or a tracking error signal (TES), by using a light-receiving device 32 having three light-receiving cells that receive 3 beams reflected from the medium 1 so as to reproduce information.

The light source system 20 includes a light source 21a for BDs, a diffraction element 22a, a coupling lens 23a, and a first beam splitter 24a. A beam from the light source 21a may be transmitted to the first beam splitter 24a through the diffraction element 22a and the coupling lens 23a. The coupling lens 23a adjusts an optical distance from the light source 21a to the medium 1 by adjusting an optical magnification, i.e., a defocusing amount of progressing light, between the light source 21a and a second beam splitter 13.

The light source system 20 may further include a light source for other media, such as compact disks (CDs) and digital versatile disks (DVDs).

The diffraction element 22a generates the main beam and the first and second sub beams by diffracting a single beam from the light source 21a. Each of the main beam and the first and second sub beams has a polarization component in a first direction (also referred to as first polarized light in this description), and a polarization component in a second direction perpendicular to the first direction (also referred to as second polarized light in this description). The diffraction element 22a may change intervals between the main beam and the first and second sub beams according to an interval or period of a lattice of the diffraction element 22a. Each of sector sizes and arrangements of light-receiving cells 32a, 32b, and 32c of the light-receiving device 32 may be suitably designed according to the diffraction element 22a. The coupling lens 23a adjusts an optical magnification of the main beam and the first and second sub beams, i.e., defocusing amounts of progressing beams from the light source 21a, between the light source 21a and the first beam splitter 24a.

Figure 2:
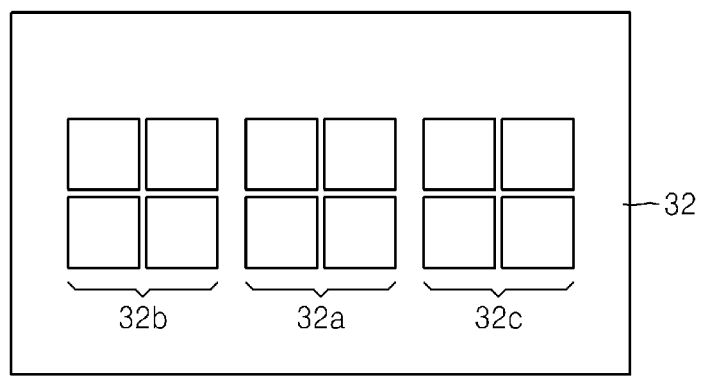
FIG. 2 is a schematic plan view illustrating an example of a light-receiving device used in the optical pickup device of FIG. 1.

The light-receiving system 30 generates an electric signal by detecting the main beam and the first and second sub beams first reflected from the medium 1 and then passed through the second beam splitter 13. The light-receiving system 30 includes the light-receiving device 32 having the three light-receiving cells 32a, 32b, and 33c, which are each divided by 4, as shown in FIG. 2, and a sensing lens 31 for focusing the main beam and the first and second sub beams respectively on the light-receiving cells 32a, 32b, and 32c of the light-receiving device 32.

The light transmitting system 10 includes an object lens 11 corresponding to the medium 1, first and second mirrors 16 and 17 for changing a path, a collimating lens 12 and the second beam splitter 13 having a plate shape. The second beam splitter 13 reflects the main beam and the first and second sub beams from the light source system 20 to the object lens 11, and transmits light reflected from the medium 1 to the light-receiving system 30.

In one example, a light controller 14 is disposed between the first mirror 16 and the second mirror 17. The light controller 14 includes a ¼ wave plate (QWP) 141 and a partial polarization control device 142.

Figure 3:
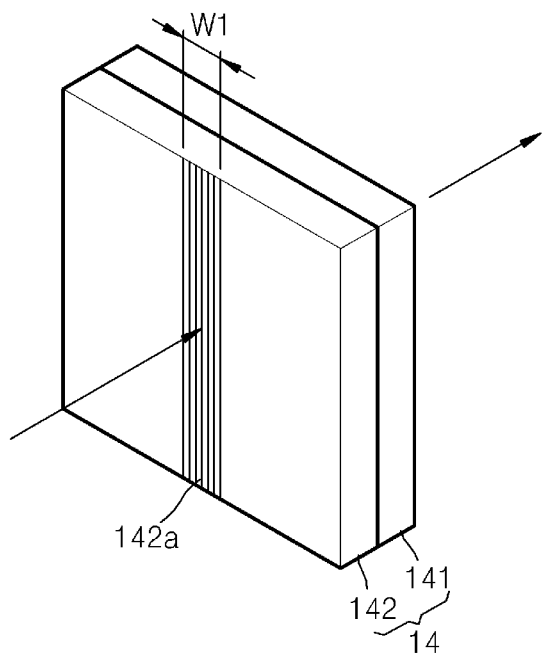
FIG. 3 is a schematic perspective view of an example of a light controller used in the optical pickup device of FIG. 1.

As shown in the example of FIG. 3, the partial polarization control device 142 and the QWP 141 may be integrally combined to form one light controller 14.

The partial polarization control device 142 is configured to block the first polarized light. The first polarized light is a P-polarization component (also referred to as P-polarized light) or an S-polarization component (also referred to as S-polarized light). In other words, the partial polarization control device 142 blocks light of an incident beam polarized in one direction. For example, the partial polarization control device may block P-polarized light or S-polarized light. In this example, the first polarized light is the P-polarized light for convenience of description.

The partial polarization control device 142, which blocks or diffracts the first polarized light, includes a polarized light controller 142a that is a strip type, i.e., in the form of a strip, has a predetermined width W1, and extends in one direction. The polarized light controller 142a is a light blocking or hologram diffraction region, and blocks or diffracts the first polarized light, for example, the P-polarized light, and transmits the second polarized light, for example, the S-polarized light. The blocking or diffracting of the first polarized light is performed on both progressing light from the light source 21a, and regressing or reflected light from the medium 1. Here, the predetermined width W1 of the polarized light controller 142a corresponds to a width W2 of a region where the light-receiving cells 32a, 32b, and 32b of the light-receiving device 32 are formed. In other words, the polarized light controller 142a blocks or diffracts the first polarized light from stray light, incident in a wide angle range, so that the first polarized light does not reach the region where the light-receiving cells 32a, 32b, and 32c are formed.

Accordingly, the stray light is prevented or limited from being transmitted to the light-receiving cells 32a, 32b, and 32c, such that only the main beam and the first and second sub beams, incident in a narrow angle range, are detected by the light-receiving cells 32a, 32b, and 32c. Referring to the example in FIG. 4, each of a main beam Lm0 and first and second sub beams Lm1 and Lm2 does not form a single spot, but has two semicircular shapes, because a center of an effective beam (each of the main beam Lm0 and the first and second sub beams Lm1 and Lm2) reflected from the medium 1 is blocked or diffracted while passing through the polarized light controller 142a. The polarized light controller 142a blocks or diffracts the P-polarized light in progressing light and reflected light. The S-polarized light passed through the partial polarization control device 142, and the P-polarized light having a center cut by the polarized light controller 142a are circular-polarized by passing through the QWP 141.

A polarization rotating direction of reflected light from the medium 1 is changed in an opposite direction from that of light incident on the medium 1, for example, from right-handed polarization to left-handed polarization, and the reflected light is changed to the P-polarized light by passing through the QWP 141. Accordingly, a part of the P-polarized light is blocked or diffracted by the polarized light controller 142a, and thus does not reach the light-receiving cells 32a, 32b, and 32c. As such, as shown in FIG. 4, the main beam Lm0 and the first and second sub beams Lm1 and Lm2 form spots respectively in the light-receiving cells 32a, 32b, and 32c, and stray light Ls that is not controlled by the polarized light controller 142a is incident on a region outside where the light-receiving cells 32a, 32b, and 32c are formed.

According to a conventional technology, only a QWP may be included in a light controller, and stray light is incident on light-receiving cells. Such stray light operates as optical noise in a sub push-pull (SPP) signal, thereby interrupting tracking of a medium.

Figure 4:
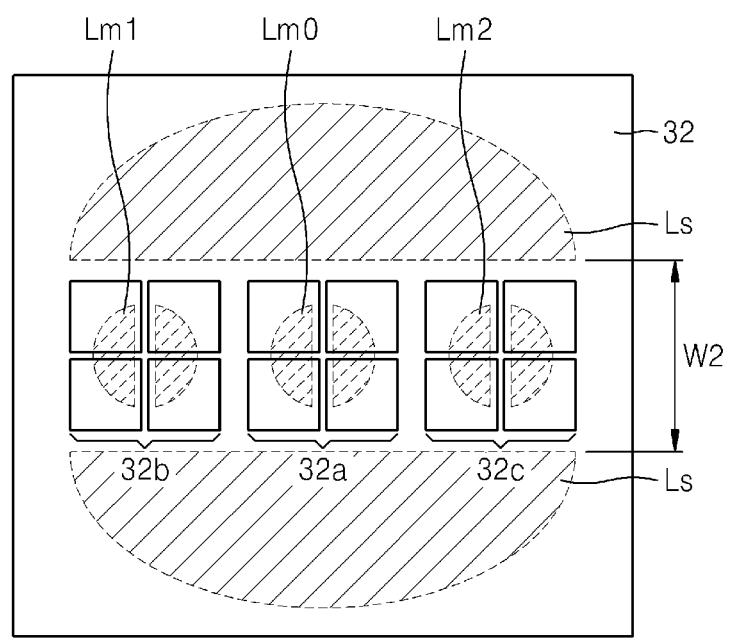
FIG. 4 is a diagram illustrating an example of a controlled light incident form of stray light in the optical pickup device of FIG. 1.
Figure 5:
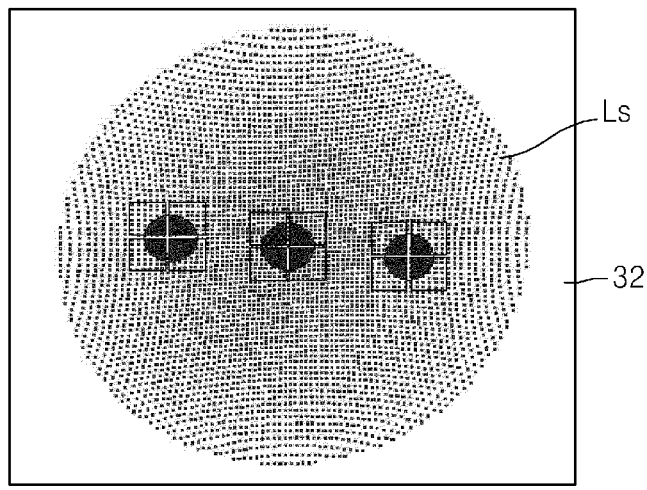
FIG. 5 is a diagram illustrating a simulation result of a light incident form on a light-receiving device not using a light controller in an optical pickup device.

FIG. 5, in comparison to FIG. 4, illustrates an incident distribution region of the stray light Ls incident on a conventional light-receiving device 32 when the partial polarization control device 142 is not used. As shown in FIG. 5, a main beam and sub beams at sides of the main beam form a normal spot in light-receiving cells, and the stray light Ls is incident on an entire surface of the light-receiving device 32 including the light-receiving cells.

Figure 6:
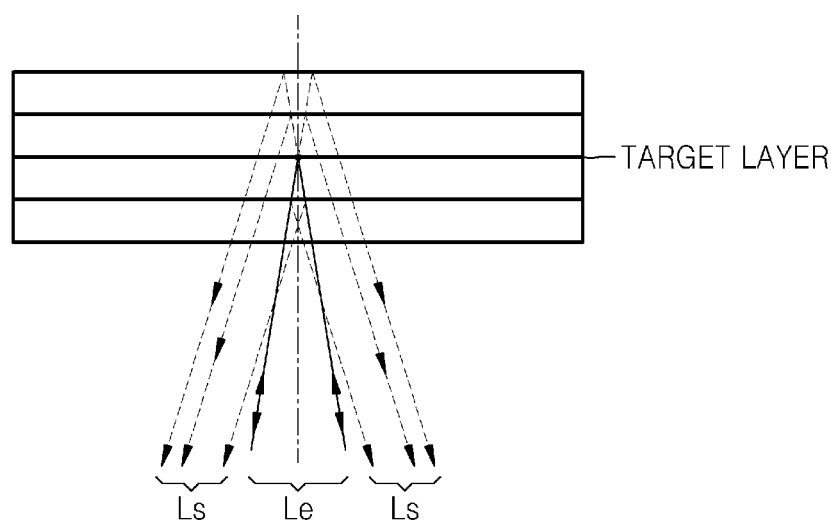
FIG. 6 is a diagram illustrating an example of a mechanism through which stray light is generated in a medium having a multilayer structure.

FIG. 6 illustrates an example of a mechanism through which the stray light Ls is generated in a medium having a multilayer structure. When a spot is formed in a target layer to be recorded or read, a part of a beam incident on the target layer is reflected from a layer above the target layer or transmits through the target layer and is reflected from a layer below the target layer, and thus the stray light Ls is generated. The stray light Ls is emitted in a wide angle range compared to effective light Le reflected from the target layer. At this time, when the stray light Ls is incident in the light-receiving cells shown in FIG. 5, the stray light Ls operates as optical noise in a light-receiving cell.

However, by using the partial polarization control device 142 described above, the stray light Ls does not reach the light-receiving cells 32a, 32b, and 32c, and thus does not operate as optical noise in the light-receiving cells 32a, 32b, and 32c.

Figure 7:
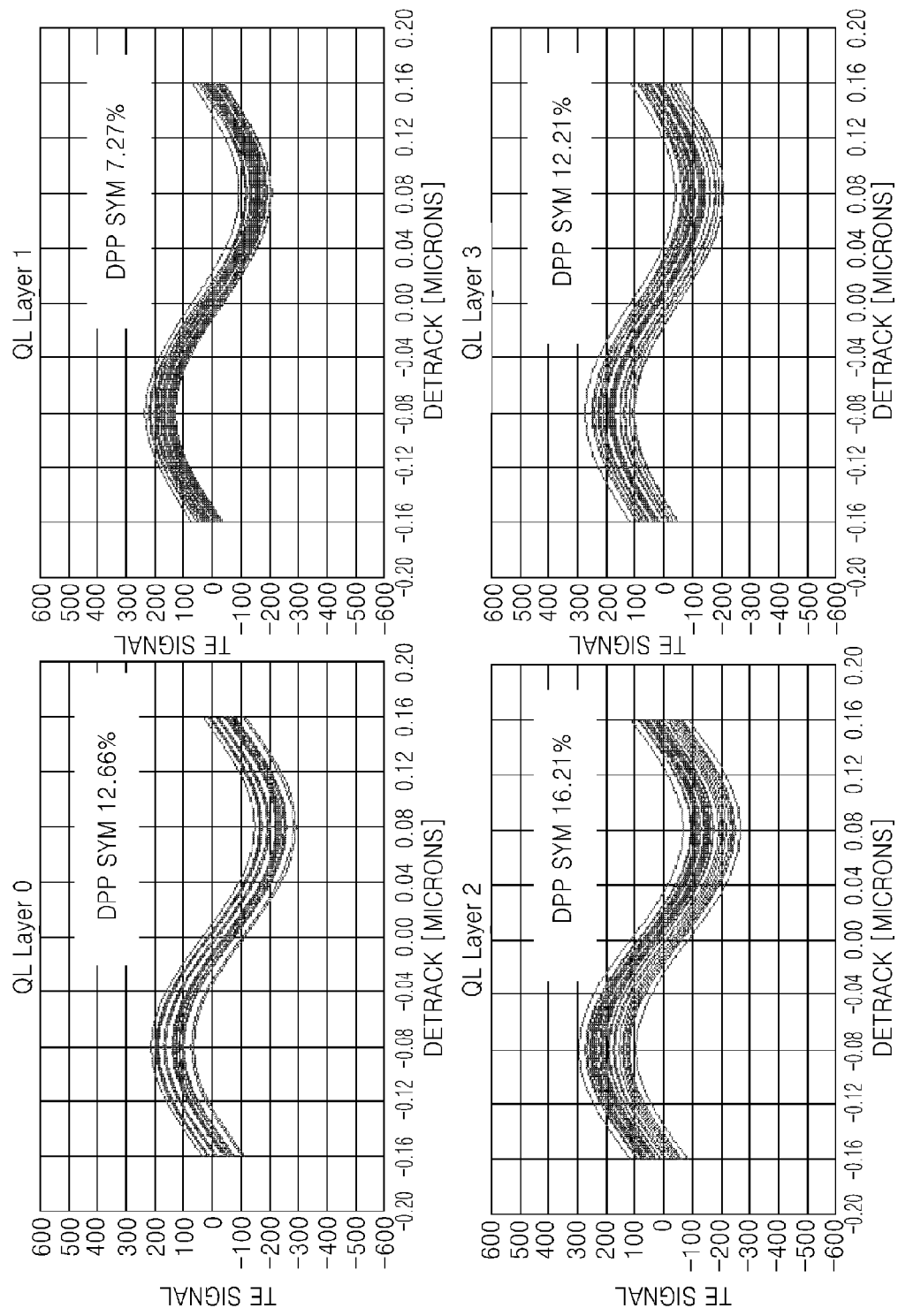
FIG. 7 illustrates graphs showing examples of differential push-pull (DPP) simulation results according to a track error signal (TES) interference phenomenon in a conventional optical pickup device.
Figure 8:
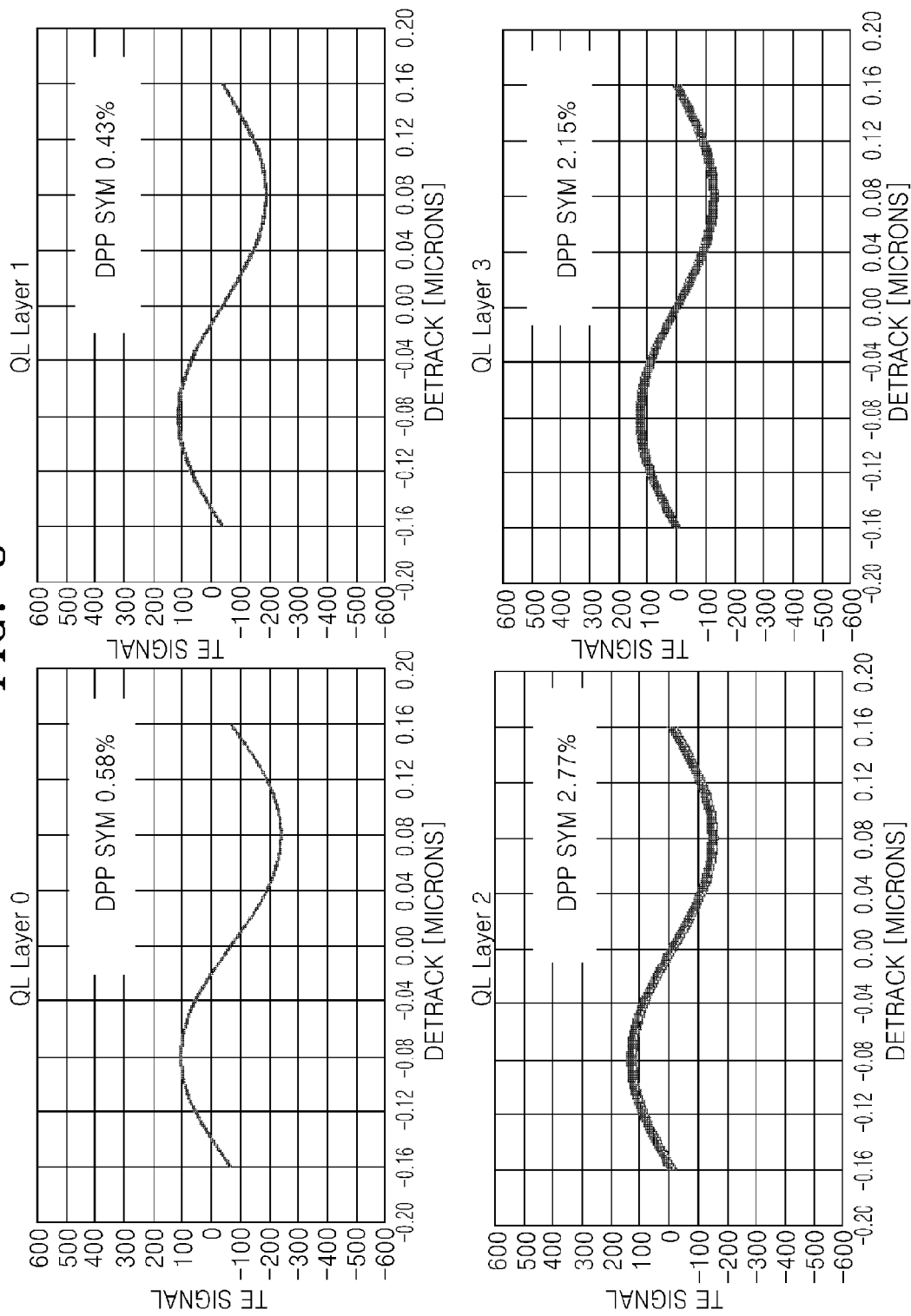
FIG. 8 illustrates graphs showing DPP simulation results when a TES interference phenomenon is removed, in an optical pickup device according to an example of the present description.
Figure 9:
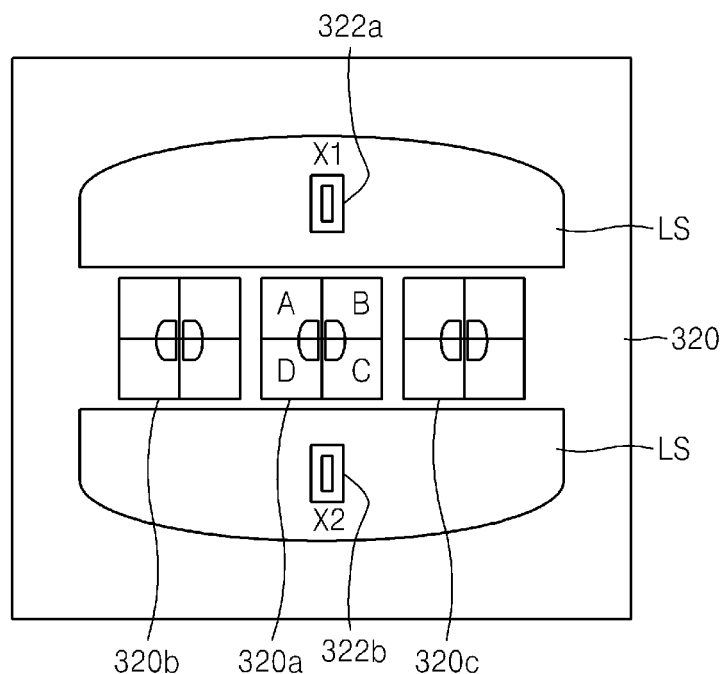
FIG. 9 is a diagram illustrating an example of diffraction of stray light and effective light in a polarization control device.

FIGS. 7 and 8 are graphs illustrating examples of differential push-pull (DPP) simulation results according to a track error signal (TES) interference phenomenon in a medium having a quadruple layer, wherein FIG. 7 illustrates the DPP simulation results in a conventional optical pickup device without a light control device, and FIG. 8 shows the DPP simulation results in an optical pickup device according to an embodiment of the present invention. Also, FIG. 9 is a diagram showing diffraction of the stray light Ls and the effective light Le in the polarization control device 142.

Comparing FIGS. 7 and 8, fluctuation ranges of waveforms in FIG. 7 are very wide, but fluctuation ranges of waveforms in FIG. 8 are narrow.

Table 1 shows the DPP simulation results of FIGS. 7 and 8 to compare fluctuations in TES.

TABLE 1

| | L0 | L1 | L2 | L3 |
|---|---|---|---|---|
| Conventional Technology | 12.66% | 7.27% | 16.21% | 21.21% |
| Present Disclosure | 0.58% | 0.43% | 2.77% | 2.15% |

As shown in Table 1, a relatively good quality TES having relatively small fluctuation may be obtained by preventing the stray light Ls, which operates as optical noise in the light-receiving cells 32a, 32b, and 32c, from being incident on the light-receiving cells 32a, 32b, and 32c. However, a light controller that blocks or diffracts the stray light Ls also cuts off a part of the effective light Le, which is to be incident on the light-receiving cells 32a, 32b, and 32c. In other words, as shown in the example of FIG. 4, centers of spots of the effective light Le, i.e., spots of the main beam Lm0 and the first and second sub beams Lm1 and Lm2, formed in the light-receiving cells 32a, 32b, and 32c are cut as shown in FIG. 4. Such cut centers denote reduced amounts of the effective light Le incident on the light-receiving cells 32a, 32b, and 32c, and thus a radio frequency (RF) signal obtained from the light-receiving cells 32a, 32b, and 32c may be reduced. Such a reduction may be compensated for by using a circuit so as to smoothly reproduce the RF signal. Alternatively, an RF signal having the same magnitude or jitter quality as a conventional RF signal may be obtained by using an additional light-receiving cell for an RF signal.

Figure 10:
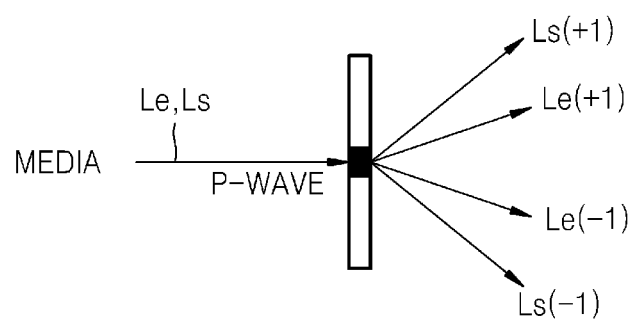
FIG. 10 is diagram illustrating another example of a light-receiving device.

FIG. 10 illustrates another example of a light-receiving device 320 according to another embodiment of the present invention.

The light-receiving device 320 further includes auxiliary light-receiving cells 322a and 322b, on which a portion of effective light Le cut off by the partial polarization control device 142 is incident, in a region where stray light Ls is incident on, from the structure of the light-receiving device 32 of FIG. 4. The auxiliary light-receiving cells 322a and 322b are disposed at sides of a main light-receiving cell 320a to which a main beam is transmitted and sides of sub light-receiving cells 320b and 320c, and respectively include light-receiving sectors X1 and X2.

Accordingly, the cut off portion of the effective light Le is incident on the auxiliary light-receiving cells 322a and 322b, along with the stray light Ls. The effective light Le is inevitably cut off by the partial polarization control device 142, which prevents the stray light Ls from being incident on the light-receiving cells 320a, 320b, and 320c. In this example, the portion of the effective light Le is used for an RF signal.

Accordingly, the polarized light controller 142a of the partial polarization control device 142 generates ±1st light of the effective light Le by diffracting a center of an incident beam and then the ±1st light of the effective light Le is incident on the auxiliary light-receiving cells 322a and 322b. Here, the polarized light controller 142a is designed in such a way that the ±1st light of the effective light Le is incident on the auxiliary light-receiving cells 322a and 322b. A divergence angle of the stray light Ls is larger than that of the effective light Le reflected from a target layer of a medium. The stray light Ls is diffracted in a large angle by the polarized light controller 142a, and is not incident on the light-receiving cells 320a, 320b, and 320c, and the ±1st light of the effective light Le, which is diffracted in a small angle, is incident on the auxiliary light-receiving cells 322a and 322b.

Of course, the stray light Ls, which is not controlled by the polarized light controller 142a is also incident on the auxiliary light-receiving cells 322a and 322b, but has a lower intensity that the effective light Le reflected from the target layer of the medium. Also, a signal obtained from the auxiliary light-receiving cells 322a and 322b is only used as an RF signal, and does not affect an MPP signal.

Figure 11:
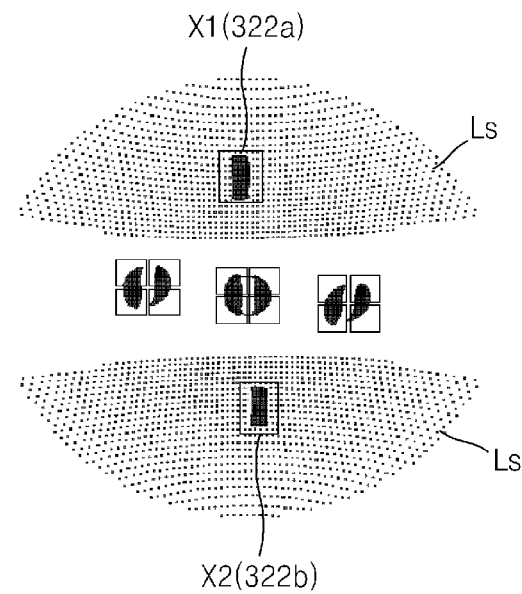
FIG. 11 is a diagram illustrating a simulation result of light incident on the light-receiving device of FIG. 10 using a polarization control device.

FIG. 11 illustrates an example of an arrangement of light-receiving cells and a form of incident light obtained via simulation. In FIG. 11, a darkest portion in each sector denotes a beam spot.

While using an electric signal obtained from the light-receiving cells, an MPP signal uses a method represented by Equation 1 below. In other words, the MPP signal is obtained by subtracting a sum signal of a "B" sector and a "C" sector from a sum signal of an "A" sector and a "D" sector in the main light-receiving cell 320a.

$$MPP=(A+D)-(B+C) \quad \text{[Equation 1]}$$

Also, an RF signal is obtained by adding all signals of sectors of the light-receiving device 320 as represented by Equation 2 below.

$$RF=A+B+C+D+X1+X2 \quad \text{[Equation 2]}$$

According to this example, electric noise due to stray light or interference light may be prevented from being generated while recording information on or reproducing information from a medium by effectively controlling the stray light, thereby generating an SPP signal or a TES having a relatively good quality. Thus, tracking may be effectively controlled.

The optical pickup device described above is used for BDs, but may also be used as a multimedia compatible optical pickup device for CDs, DVDs, and BDs.

Figure 12:
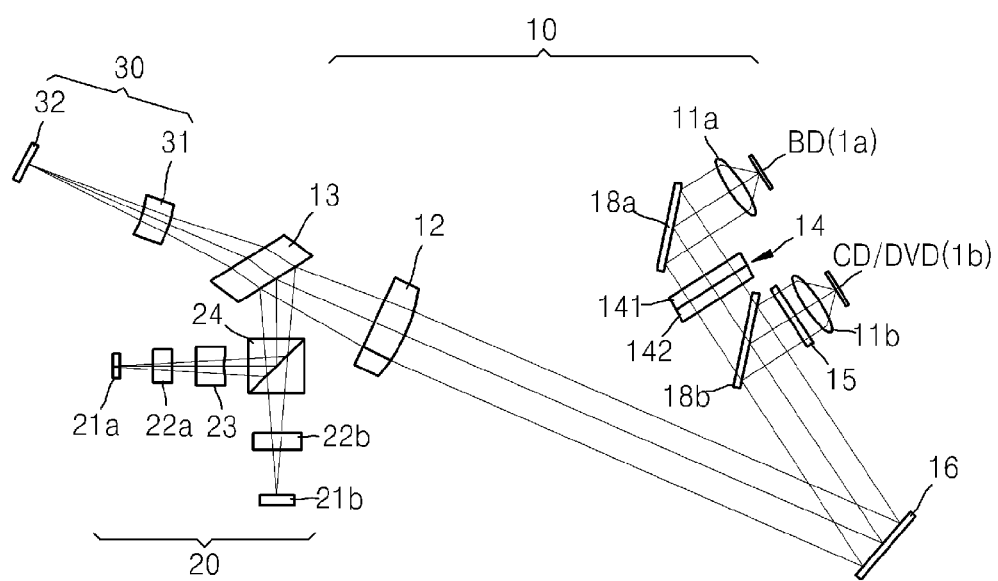
FIG. 12 is a schematic diagram illustrating another example of an optical pickup device.

FIG. 12 schematically illustrates structure of an example of an optical pickup device designed for CD, DVD, and BD compatibility.

Object lenses 11a and 11b are respectively disposed below a medium 1a corresponding to BDs and a medium 1b corresponding to CDs and DVDs. A total reflection mirror 18a is disposed below the object lens 11a, and a dichroic mirror 18b is disposed below the object lens 11b, so that blue light is transmitted and light for CDs and DVDs, that is, light having a long wavelength, is reflected. The total reflection mirror 18a and the dichroic mirror 18b are disposed on a light proceeding path of a mirror 16 for changing an optical path. The mirror 16 reflects light from a first beam splitter 13 to the dichroic mirror 18b, and reflects light reflected from a medium to the first beam splitter 13.

Here, the light controller 14 described above is disposed between the total reflection mirror 18a and the dichroic mirror 18b. As described above, the light controller 14 includes the QWP 141 and the partial polarization control device 142. Meanwhile, a separate QWP 15 is disposed between the dichroic mirror 18b and the object lens 11b.

The light source system 20 includes a plurality of light sources corresponding to the media 1a and 1b, for example, a first light source 21a for BDs and a second light source 21b for CDs and DVDs, wherein the first light source 21a and the second light source 21b irradiate light to different surfaces of a second beam splitter 24 having a cubic structure. A coupling lens 23 for adjusting an optical distance from the first light source 21a to the medium 1a or 1b by adjusting an optical magnification, i.e., a defocusing amount of progressing light, is disposed between the first light source 21a and the second beam splitter 24. Light incident on the second beam splitter 24 from the first and second light sources 21a and 21b is transmitted to the first beam splitter 13. A diffraction element 22a for BDs and a diffraction element 22b for CDs and DVDs each generate a main beam and ±1st sub beams, and are disposed respectively between the second beam splitter 24 and the first light source 21a and between the second beam splitter 24 and the second light source 21b. Intervals between a main beam and ±1st sub beams may be changed according to an interval of a lattice of a diffraction element.

Figure 13:
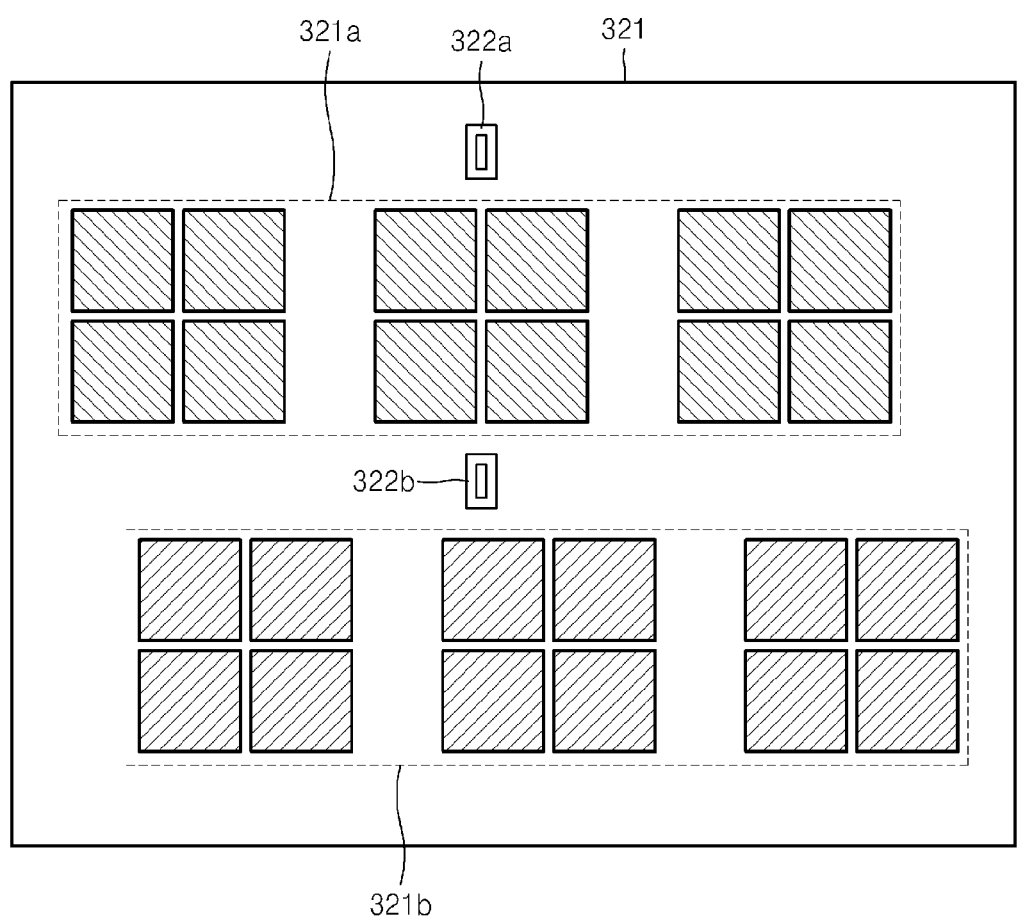
FIG. 13 is a schematic plan view illustrating an example of a light-receiving device used in the optical pickup device of FIG. 12.

FIG. 13 schematically illustrates an example of a light-receiving device 321 applied to the optical pickup device of FIG. 12.

The light-receiving device 321 includes a first light receiver 321a for DVDs and BDs, and a second light receiver 321b for CDs. Each of the first and second light receivers 321a and 321b includes a main light-receiving cell at a center and two sub light-receiving cells at sides of the main light-receiving cell. The first light receiver 321a is not aligned with the second light receiver 321b. The auxiliary light-receiving cells 322a and 322b described above are disposed above and below the main light-receiving cell of the first light receiver 321a.

Figure 14:
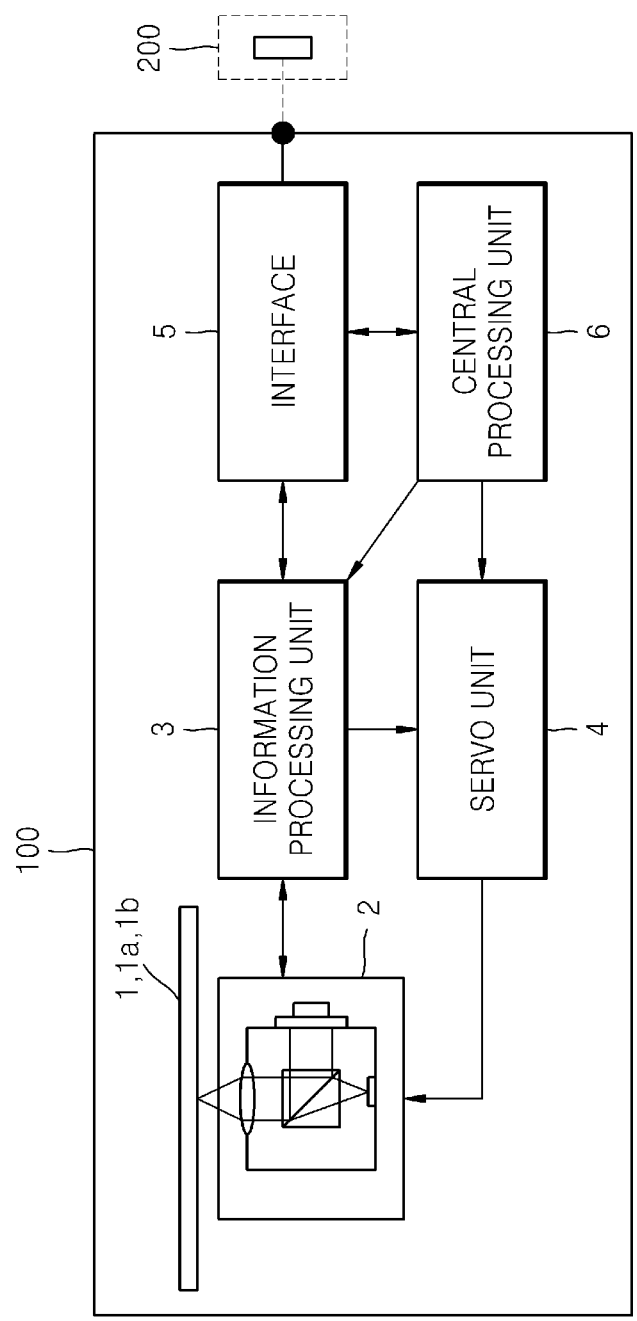
FIG. 14 is a schematic block diagram illustrating an example of an optical disk drive using an optical pickup device.

FIG. 14 schematically illustrates an optical drive 100 using any one of the examples of the optical pickup devices described above.

The optical drive 100 includes an optical pickup device 2 according to any one of the examples of the optical pickup devices described above, so as to read information from or record information on media 1, 1a, and 1b. The optical pickup device 2 includes an optical system described above, and a mechanical system for mechanically supporting the optical system and performing a focusing operation, a tracking operation, etc. The optical system includes an encoder and a decoder, and is connected to an information processing unit 3 that is connected to an interface 5 to be connected to an external host (not shown). Also, the mechanical system is connected to a servo unit 4. The information processing unit 3, the servo unit 4, and the interface 5 are controlled by a central processing unit 6. The interface 5 follows various standards, and may include a universal serial bus (USB) port. Thus, the interface 5 transmits and receives information to and from a host, for example, a computer 200, via a USB protocol.

In the examples above, stray light generated in a medium having at least two layers, such as a DVD or a BD, may be suitably controlled in such a way that effective light, and not the stray light, reaches a light-receiving device of a light-receiving system. Accordingly, an SPP signal having a relatively good quality may be obtained since generation of noise due to the stray light may be suppressed, and thus a tracking control error generated due to the stray light from the medium may be effectively prevented or limited.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An optical pickup device comprising:
a light transmitting system comprising an object lens for facing a medium having multiple recording layers for storing information;
a light source system for providing a plurality of beams used to record information on or reproduce information from the multi recording layer via the light transmitting system;
a light-receiving system disposed on a path of a beam reflected from the medium, and the light-receiving system comprising a light-receiving device that comprises a plurality of light-receiving cells corresponding to the plurality of beams; and
a light controller comprising a light control device that blocks a first type of polarized light and allows a second type of polarized light to pass through for controlling stray light generated in the medium such that the stray light is prevented from reaching the light-receiving device, in the light transmitting system.

2. The optical pickup device of claim 1, wherein the light control device comprises a polarized light controller corresponding to the plurality of light-receiving cells, wherein the polarized light controller blocks or diffracts first polarized light from among first and second polarized lights.

3. The optical pickup device of claim 2, wherein the polarized light controller generates ±1st light by diffracting the first polarized light from among the first and second polarized lights, and the light-receiving device comprises an auxiliary light-receiving cell for receiving ±1st light of effective light generated in the medium from among the diffracted first polarized light.

4. The optical pickup device of claim 1, wherein the plurality of beams comprise a main beam and two sub beams disposed at sides of the main beam, and
the light-receiving device comprises a main light-receiving cell corresponding to the main beam, and sub light-receiving cells respectively corresponding to the two sub beams.

5. The optical pickup device of claim 4, wherein the light control device comprises a polarization diffraction element for controlling the stray light such that the stray light does not reach the plurality of light-receiving cells, and
the polarized light controller is a polarization hologram region for diffracting first polarized light from among first and second polarized lights, wherein the polarization hologram region diffracts the stray light reflected from the medium such that the stray light is not incident on the light-receiving device, and diffracts a part of effective light reflected from the medium to the sub light-receiving cells.

6. A method of controlling a light, performed by an optical pickup device, the method comprising:
forming, by the optical pickup device, a plurality of beams directed toward a recording layer of an information storage medium;
generating, by the optical pickup device, an electric signal by transmitting a beam reflected from the information storage medium to a light-receiving device; and
blocking a first type of polarized light and allowing a second type of polarized light to pass through, by the optical pickup device, such that stray light does is prevented from reaching the light-receiving device from the beam reflected from the information storage medium.

7. The method of claim 6, wherein the controlling of the stray light comprises blocking or diffracting first polarized light from among first and second polarized lights.

8. The method of claim 7, wherein the controlling of the stray light comprises:
generating ±1st light by diffracting the first polarized light from among the first and second polarized lights; and
transmitting ±1st light of effective light generated in the information storage medium from among the diffracted first polarized light to the light-receiving device.

9. The method of claim 6, wherein the plurality of beams comprise a main beam and two sub beams disposed at sides of the main beam, and
the light-receiving device comprises a main light-receiving cell corresponding to the main beam, and two sub light-receiving cells respectively corresponding to the two sub beams.

10. The method of claim 9, wherein the light control device comprises a polarization diffraction element for controlling the stray light such that the stray light does not reach the plurality of light-receiving cells, wherein the polarization diffraction element is a polarization hologram region for diffracting first polarized light from among first and second polarized lights, and the polarization hologram region diffracts the stray light reflected from the medium such that the stray light is not incident on the light-receiving device, and diffracts a part of effective light reflected from the medium to the sub light-receiving cells.

11. An optical disk drive comprising:
an optical pickup device comprising:
a light transmitting system comprising an object lens for facing a medium having a multi recording layer for storing information;
a light source system for providing a plurality of beams used to record information on or reproduce information from the multi recording layer via the light transmitting system;
a light-receiving system disposed on a path of a beam reflected from the medium, and comprising a light-receiving device that comprises a plurality of light-receiving cells corresponding to the plurality of beams; and
a light controller comprising a light control device that blocks a first type of polarized light and allows a second type of polarized light to pass through for controlling stray light generated in the medium such that the stray light is prevented from reaching the light-receiving device, in the light transmitting system;
an information processing unit for processing a signal output from the optical pickup device;
a servo unit for generating a control signal for controlling the optical pickup device; and
a central processing unit for controlling the information processing unit and the servo unit.

12. The optical disk drive of claim 11, wherein the light control device controls the stray light such that the stray light does not reach the plurality of light-receiving cells of the light-receiving device.

13. The optical disk drive of claim 11, wherein the light control device comprises a polarized light controller corresponding to the plurality of light-receiving cells.

14. The optical disk drive of claim 13, wherein the polarized light controller blocks or diffracts first polarized light from among first and second polarized lights.

15. The optical disk drive of claim 13, wherein the polarized light controller controls light diffracted by diffracting first polarized light from among first and second polarized lights such that the light does not reach the plurality of light-receiving cells.

16. The optical disk drive of claim 13, wherein the polarized light controller generates ±1st light by diffracting first polarized light from among first and second polarized lights, and
the light-receiving device comprises an auxiliary light-receiving cell for receiving ±1st light of an effective light generated in the medium from among the diffracted first polarized light.

17. The optical disk drive of claim 11, wherein a ¼ wave plate is disposed between the light controller and the object lens.

18. The optical disk drive of claim 11, wherein the light-receiving device comprises:
a main light-receiving cell corresponding to a main beam; and
two sub light-receiving cells respectively corresponding to two sub beams.

19. The optical disk drive of claim 18, wherein the sub light-receiving cells are disposed at sides of the main light-receiving cell;
the light control device comprises a polarization diffraction element for controlling the stray light such that the stray light does not reach the plurality of light-receiving cells; and
the polarized light controller is a polarization hologram region, in which first polarized light from among first and second polarized lights is diffracted, wherein the polarization hologram region diffracts the stray light reflected from the medium such that the stray light is not incident on the light-receiving device, and diffracts a part of effective light reflected from the medium to the sub light-receiving cells.

20. The optical disk drive of claim 19, wherein a ¼ wave plate is disposed between the light controller and the object lens.

21. An optical pickup device comprising:
a light transmitting system;
a light source system;
a light receiving system; and
a light controller comprising a ¼ wave plate, and a polarization control device configured to block a first type of polarized light and allow a second type of polarized light to pass through such that stray light is prevented from reaching the light receiving system.

22. The optical pickup device of claim 21, wherein the polarization control device comprises a polarized light controller formed as a strip of a predetermined width and extending in one direction.

23. The optical pickup device of claim 22, wherein the polarized light controller is a light blocking region or hologram diffraction region.

24. The optical pickup device of claim 21, wherein the light controller is configured to block the first type of polarized light on both progressing light from the light source and reflected light from the medium.

25. The optical pickup device of claim 21, wherein the light controller is configured block P-polarized type light.

* * * * *